United States Patent [19]
Kohley

[11] 4,229,019
[45] Oct. 21, 1980

[54] TRANSPORT LOCK FOR LIFT BED TRAILER JACKBOX

[75] Inventor: Charles R. Kohley, Rensselaer, Ind.

[73] Assignee: Eugene A. LeBoeuf, Noblesville, Ind.

[21] Appl. No.: 941,297

[22] Filed: Sep. 11, 1978

Related U.S. Application Data

[63] Continuation-in-part of Ser. No. 823,680, Aug. 11, 1977, abandoned.

[51] Int. Cl.³ ............................................. B62D 21/02
[52] U.S. Cl. .............................. 280/438 R; 280/43.23; 414/495
[58] Field of Search .............................. 414/495, 498; 280/43.17, 43.23, 423 R, 438 R, 789

[56] References Cited

U.S. PATENT DOCUMENTS

| 4,050,707 | 9/1977 | Glumac | 414/495 X |
| 4,061,353 | 12/1977 | Kingman | 414/495 X |

Primary Examiner—Robert G. Sheridan
Attorney, Agent, or Firm—Leydig, Voit, Osann, Mayer & Holt, Ltd.

[57] ABSTRACT

A lift bed highway trailer adapted to be coupled by a gooseneck to a tractor to transport heavy loads through use of pallet frame units that can be quickly picked up and discharged at any point, the main frame of the trailer being shiftable between a lowered loading and unloading position and a raised transprot position. The trailer includes an improved power actuated locking mechanism in the gooseneck structure for positively securing the forward end of the main frame in the raised transport position.

9 Claims, 6 Drawing Figures

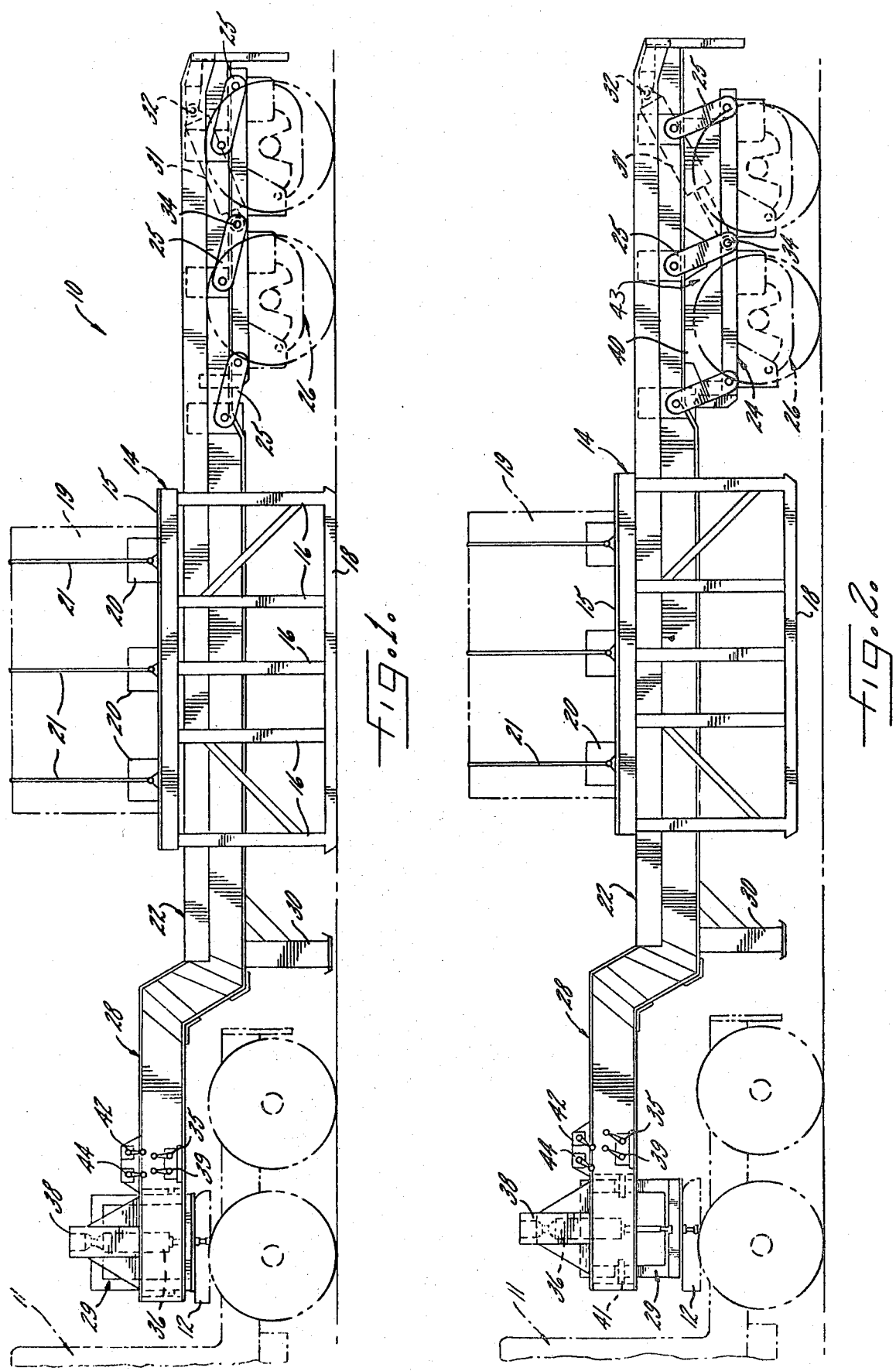

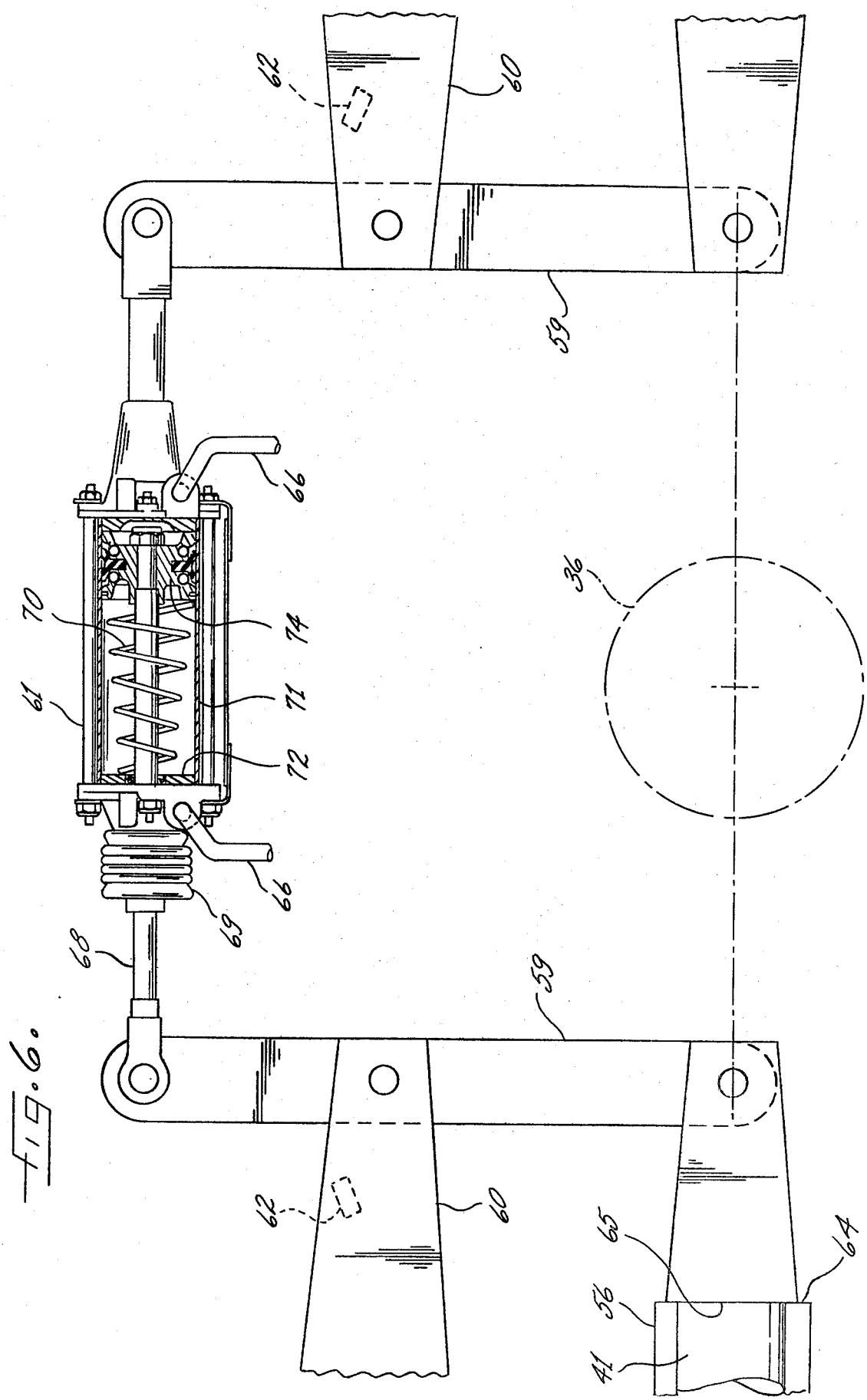

TRANSPORT LOCK FOR LIFT BED TRAILER JACKBOX

DESCRIPTION OF THE INVENTION

This application is a continuation-in-part of my earlier filed copending application Ser. No. 823,680, filed Aug. 11, 1977, now abandoned.

The present invention relates to lift bed vehicles of the type adapted to transport heavy loads through the use of pallet frame units that can be quickly picked up and discharged at any desired point. The use of such pallet frame units permits quick separation of the load from the vehicle without waiting for additional equipment or personnel, thereby maximizing the availability of the vehicle for transport rather than storage.

More specifically, the invention relates to a lift bed highway trailer adapted to be coupled via a gooseneck to a tractor by the usual fifth wheel connection and utilizing pallet frame units in transporting heavy loads. The trailer has a main frame or bed shiftable between a lowered loading and unloading position and a raised transport position and includes an improved power actuated transport locking mechanism in its gooseneck structure. The term "highway trailer", as used herein, is intended to include various "off the road" applications where the trailer is used in an industrial complex such as a steel mill or manufacturing plant.

The present invention represents an improvement over the one disclosed in Stephen A. Kingman et al. application Ser. No. 650,669, filed Jan. 20, 1976, now U.S. Pat. No. 4,061,353, issued Dec. 6, 1977.

One object of the invention is to provide a lift bed trailer of the character set forth above including a quick acting, positive locking mechanism in the gooseneck structure for maintaining the forward end of the main frame in raised transport position with maximum safety.

Another object of the invention is to provide a lift bed trailer of the foregoing type wherein the transport locking mechanism is positively actuated under power to effect both engagement and disengagement of the mechanism.

Another object of the invention is to provide a lift bed trailer of the above type wherein the transport locking mechanism includes a fail safe means for maintaining said mechanism in locked condition in the event of a power failure.

A further object is to provide a lift bed trailer of the foregoing character wherein the transport locking device may be engaged as an incident to elevating the main frame to, or slightly through, its raised transport position.

Other objects and advantages will become apparent as the following description proceeds, taken together with the accompanying drawings, in which:

FIG. 1 is a side elevational view of a lift bed trailer embodying the present invention, the trailer being in lowered position and backed under a loaded pallet frame unit preparatory to picking it up;

FIG. 2 is a view similar to Fig. 1 but showing the lift bed trailer and load in raised or transport position with the loaded pallet frame unit in place thereon;

FIG. 6 is a still further enlarged plan view of the locking mechanism with the actuator shown in horizontal section.

Figure 3:
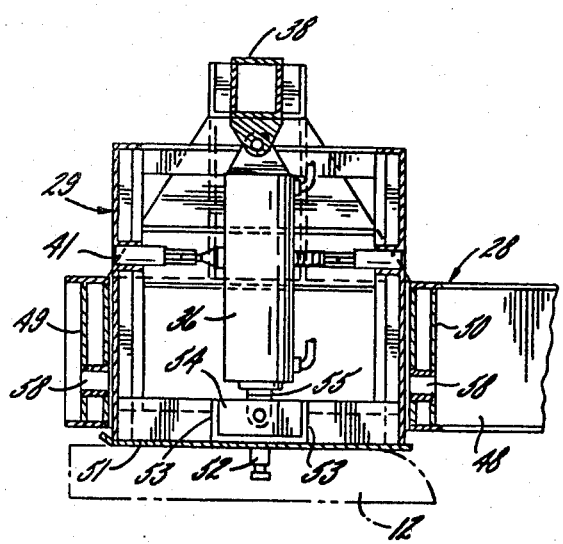
FIG. 3 is an enlarged vertical sectional view taken through the jackbox in the plane of the fore and aft center line of the trailer with the latter in lowered position.

While the invention is susceptible of various modifications and alternative constructions, a certain illustrative embodiment has been shown in the drawings and will be described below in considerable detail. It should be understood, however, that there is no intention to limit the invention to the specific form described but, on the contrary, the intention is to cover all modifications, alternative constructions and equivalents falling within the scope of the appended claims.

Referring more specifically to FIG. 1, the invention is there exemplified in an illustrative lift bed trailer 10 arranged to be coupled to a tractor 11 by means of a conventional fifth wheel connection 12. The trailer 10 is adapted to transport heavy loads through the use of one or more pallet frame units 14 that can be quickly picked up and quickly discharged at any desired point, thus maximizing the availability of the trailer for transport rather than storage. The pallet frame unit 14 is designed to straddle the bed of the trailer and the latter, when in loading or unloading position, may be moved freely under the unit 14.

The pallet frame unit 14 in this instance is fashioned as a weldment comprising a load carrying platform 15 supported on two laterally spaced sets of legs 16. Each set has a ground engaging skid 18 fixed to the lower ends of the legs. The skid and legs are made from relatively heavy steel tubing of square or rectangular cross section, while the platform 15 may be formed by transverse I-beams and appropriate steel or wood decking. The two sets of legs 16 are spaced a sufficient distance apart to straddle the trailer bed, with adequate clearance on each side to permit the trailer to be easily backed under the platform 15. The latter may, for example, support a steel coil 19 thereon by means of chocks 20 and tie-down bands or chains 21. The coil 19 may weigh up to 50,000 pounds.

The trailer 10 comprises a liftable main frame or bed 22 of generally rectangular configuration and constructed of relatively heavy steel structural members. The main frame 22 is connected at its rearward end to a subframe 24 by a plurality of pivot arms 25. The subframe 24 is ground supported through an underlying wheeled suspension 26. The forward end of the main frame 22 is rigidly fixed to a gooseneck 28 which includes a jackbox 29 adapted to engage the fifth wheel of the tractor 11. The forward end of the main frame 22 also includes a pair of landing legs 30 for supporting it when the trailer is detached from the tractor.

For the purpose of shifting the main frame 22 of the trailer between the lowered loading and unloading position (Figs. 1 and 3), and a raised transport position (FIGS. 2 and 4), the trailer 10 is provided with a pair of independent hydraulic actuators of the conventional double acting type. These include hydraulic actuator 31 connected between a pivot point 32 on the main frame 22 and a pivot point 34 on the subframe 24. The actuator 31 is operated from the hydraulic system of the tractor by means of control valve 35 on the gooseneck and is adapted to raise and lower the rearward end portion of the main frame 22. The other actuator 36 is interposed between the bottom of the jackbox 29 and a yoke 38 fixed to the upper portion of the gooseneck 28, the jackbox and gooseneck being vertically movable relative to each other. The actuator 36 is operated from the hydraulic system of the tractor by means of control valve 39 also located on the gooseneck and is adapted to raise and lower the forward end portion of the main frame.

Provision is made in the trailer 10 for positively and safely locking the main frame 22 in raised transport position by the use of quick acting, power actuated locking mechanisms 37, 43 on the trailer subframe 24 and in the gooseneck structure 28, respectively. The locking mechanism 43 in the suspension subframe 24 includes lift spacers 40 and is controlled by valve 42 on the gooseneck. Its construction and operation may correspond to that disclosed in the aforesaid Kingman et al. application Ser. No. 650,669. The locking mechanism 37 in the gooseneck structure includes locking devices 41 and is controlled by the valve 44, also on the gooseneck. Power for both mechanisms is supplied by the compressed air system of the tractor.

Referring more specifically to the locking mechanism 37 of the gooseneck structure, (FIGS. 3-5), it will be noted that the gooseneck 28 is fashioned adjacent its forward end with a large rectangular opening 45 which telescopically houses the jackbox 29. The opening 45 is in this instance defined by an open box liner 46 consisting of four side walls secured between longitudinal I-beam members 47, 48 of the gooseneck and transverse struts 49, 50. The jackbox 29 has a bottom plate 51 with a depending connecting pin 52 and rests on the tractor fifth wheel 12. The upper side of the plate 51 is provided with a number of reinforcing ribs 53, 54, the latter serving as an anchorage for the lower end 55 of the piston rod of hydraulic actuator 36.

The upper half of the jackbox 29 (FIGS. 3-5) includes the locking devices 41 in the form of a pair of shot pins disposed in the longitudinal center plane of the trailer and adapted to be moved outwardly or inwardly in opposite directions with respect to the jackbox. The shot pins 41 are slidably mounted in guide bushings 56 attached respectively to the front and rear walls of the jackbox. Mounted outside the front and rear walls and disposed for registration and engagement with the shot pins are a pair of bushings 58 fixed to the jackbox liner 46 and to the forward and rearward transverse struts 49, 50, respectively.

Figure 4:
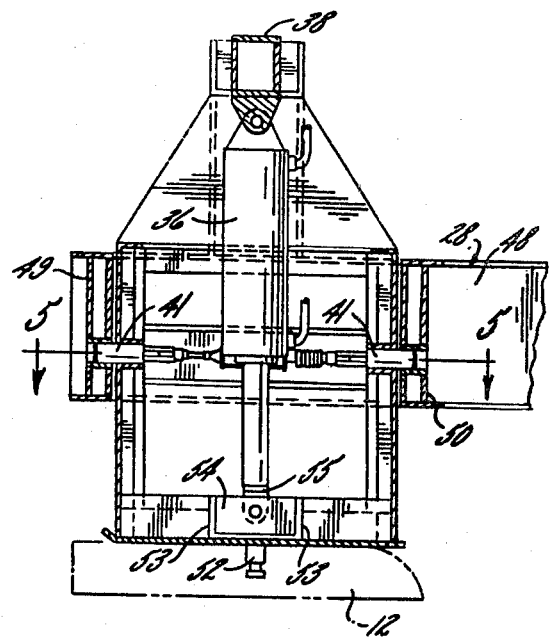
FIG. 4 is a vertical sectional view similar to Fig. 3 but with the trailer in raised transport position.
Figure 5:
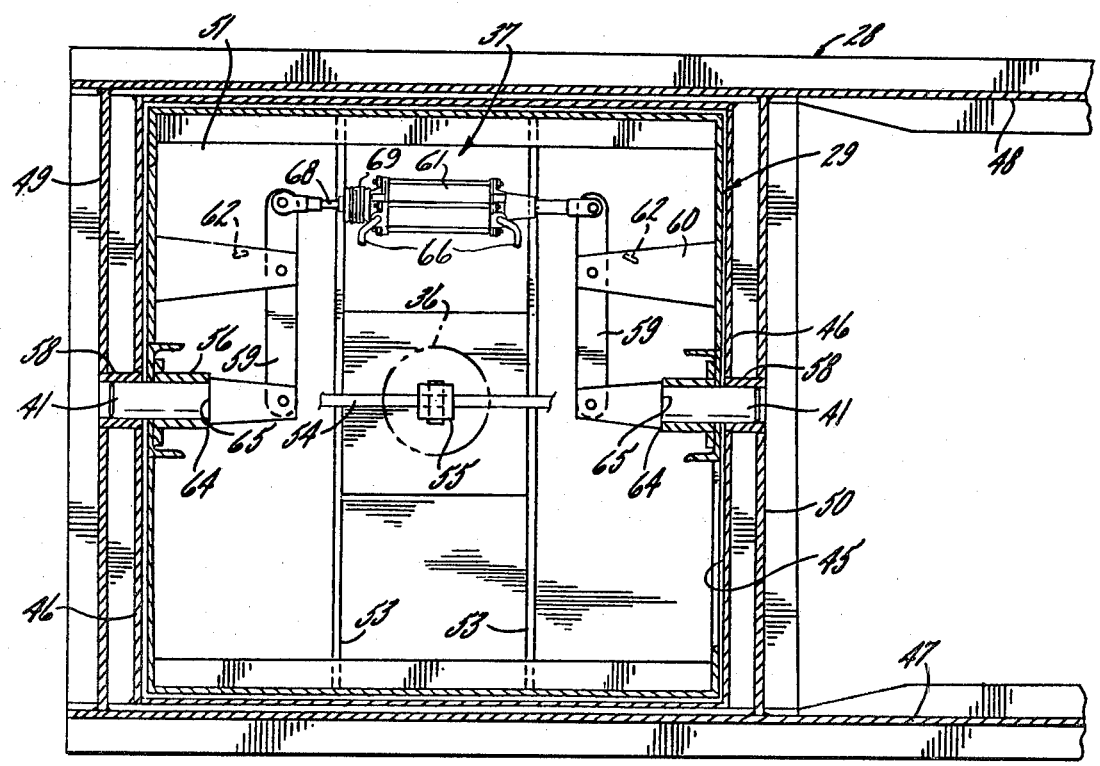
FIG. 5 is a further enlarged horizontal sectional view taken through the jackbox in the plane of the line 5—5 in FIG. 4.

Provision is made for positively actuating the transport locking mechanism 37 of the gooseneck structure under power on both the locking stroke for effecting engagement between the shot pins 41 and bushings 58, and on the return stroke for effecting withdrawal of the pins 41 from the bushings 58. Referring more specifically to Figs. 3-5, it will be noted that the foregoing is accomplished by pivotally attaching the inner end of each shot pin 41 to one end of a rocker arm 59 fulcrumed intermediate its ends on a fixed bracket 60 projecting inwardly from the jackbox wall. Interposed between and pivotally connected to the opposite ends of the rocker arms 59 is a double acting pressure fluid actuator 61 adapted to move the shot pins 41 through their locking and their return strokes. The limits of each stroke are defined by a stop abutment 61 on each bracket 60 which engages a corresponding one of the rocker arms 59, and by a stop abutment 64 defined by the inner end of each shot pin guide bushing 56 which engages a corresponding transverse shoulder 65 on its associated shot pin.

As noted earlier herein, the shot pins 41 are disposed in the longitudinal center plane of the trailer. To achieve the necessary length of shot pin stroke within the space limitations of the jackbox 29, the rocker arms 59, support brackets 60, and double acting actuator 61 are offset laterally in the same direction from the longitudinal center plane of the trailer.

In the present instance, the actuator 61 is an air cylinder connected to the control valve 44 on the gooseneck and to the tractor air system by flexible hoses 66, both of which are shown fragmentarily in FIG. 5. The actuator 61 has an extensible and retractable piston rod 68 covered with a flexible protective boot 69. Extension of the piston rod 68 to the right with respect to the actuator body (as viewed in FIG. 5) serves to withdraw the shot pins 41 for their return stroke. Conversely, withdrawal of the piston rod 68 to the left and into the actuator body (as viewed in FIG. 5) serves to extend the shot pins 41 for their locking stroke.

To operate the locking mechanism 37 in the gooseneck structure, and with the trailer in lowered position as shown in FIGS. 1 and 3, the control valve 44 is turned to apply pressurized air to the actuator 61 in the proper direction to extend the piston rod 68 and thus retract the shot pins 41 inwardly of the jackbox. The forward hydraulic actuator 36, as well as the rearward hydraulic actuator 31, is then energized to commence lifting the trailer bed 22 toward transport position. As soon as the transverse struts 49, 50 cover the ends of the retracted shot pins, the lever 44 is shifted to apply pressurized air to the actuator in the proper direction to retract the piston rod 68, thus tending to urge the shot pins outwardly so that their outer ends press against the jackbox liner 46 of the transverse struts 49, 50. With continued uper motion of the trailer bed and gooseneck, the ends of the shot pins, under applied force of the actuator 64, ride along the opposed surfaces of the gooseneck liner 46 until they register with the bushings 58 of the transverse struts. At that point, the shot pins snap into full engagement with the strut bushings 58 under the positive driving force of the actuator 61, securely locking the forward portion of the main frame and gooseneck in raised transport position. Pressure in the forward hydraulic actuator 36 is then released, leaving the weight of the forward end of the trailer fully supported on the shot pins.

To release the mechanism 43, the reverse sequence is followed. The forward and rearward hydraulic actuators 36, 31 are pressurized to carry the weight of the trailer bed. The lever 44 is then operated to admit pressurized air to actuator 61 in the proper direction to extend the piston rod 68, thus retracting the shot pins 41. The hydraulic actuators 36, 31 may then be deenergized to allow the main frame to sink to the lowered loading and unloading position.

In order to enhance the safety and reliability of the locking mechanism 37, the latter is constructed and arranged to be fail safe in the event of a power failure when the locking pins 41 are engaged and the liftable bed is in transport position. Such power failure may occur, for example, due to a broken hose, pump failure, or some other break in the system which supplies pressure fluid to the actuator 61. Referring more specifically to FIG. 6, it will be noted that the fail safe objective is achieved by interposing a retractor spring 70 in the actuator cylinder 71 between the rod end 72 of the cylinder and the opposed face of the piston 74. In the present instance, the spring 70 happens to be of tapered form with its smaller end abutting the cylinder end 72. The spring 70 is disposed in surrounding relation with the piston rod 68 and out of contact with the inner surface of the cylinder.

Upon occurrence of a power failure which deprives the actuator 61 of a source of compressed air or other pressure fluid when the locking pins 41 are in their extended or engaged position, the spring 70 tends to bias the actuator toward its retracted position. Due to the mechanical connection provided by the rocker arms between the actuator 61 and the locking pins 41, the retracting force of the spring 70 tends to hold the piston rod 68 and piston in retracted position, thereby maintaining the pins 41 in their fully engaged position. The locking mechanism is thus maintained in a fail safe, fully engaged position.

I claim as my invention:

1. In a lift bed highway trailer attachable to a tractor by means of a fifth wheel connection and adapted to carry a pallet frame unit with legs spaced to straddle the trailer, the combination comprising:
   (a) a liftable main frame having a lowered loading and unloading position and a raised transport position;
   (b) a subframe underlying said main frame and pivotally connected to same;
   (c) a wheeled suspension underlying said subframe and adapted to serve as a ground support therefor;
   (d) a gooseneck fixed to the forward end of said main frame and having a pair of longitudinal structural members and a pair of transverse structural members defining a jackbox opening therebetween;
   (e) a jackbox mounted within said opening for vertical sliding movement relative to said gooseneck, said jackbox being adapted for attachment to the tractor fifth wheel;
   (f) power lift means for moving said main frame and gooseneck between the lowered loading and unloading position and the raised transport position;
   (g) a pair of power actuated shot pins mounted in said jackbox in axially spaced relation with each other in the longitudinal center plane of the trailer, said shot pins being adapted to be moved outwardly from said jackbox in a locking stroke to engage said gooseneck and inwardly in a return stroke to disengage said gooseneck;
   (h) abutment means defining the limits of the locking stroke and the return stroke of said shot pins; and
   (i) means including a double acting fluid actuator connected between said shot pins and offset laterally from said longitudinal center plane of the trailer; said actuator being adapted to drive said shot pins positively through both the locking stroke and the return stroke.

2. In a lift bed highway trailer attachable to a tractor by means of a fifth wheel connection and adapted to carry a pallet frame unit with legs spaced to straddle the trailer, the combination comprising:
   (a) a liftable main frame having a lowered loading and unloading position and a raised transport position;
   (b) a gooseneck fixed to the forward end of said main frame having a pair of longitudinal structural members and a pair of transverse structural members defining a jackbox opening therebetween;
   (c) a first pair of bushings mounted in the jackbox opening and secured to respective ones of said gooseneck structural members;
   (d) a jackbox mounted within said opening for vertical sliding movement relative to said gooseneck, said jackbox being adapted for attachment to the tractor fifth wheel;
   (e) power lift means for moving said main frame and gooseneck between the lowered position and the raised transport position;
   (f) a second pair of bushings mounted in said jackbox and situated for registration with said first pair of bushings when said liftable main frame is in the raised transport position;
   (g) a pair of power actuated shot pins slidably mounted in said jackbox bushings in axially spaced relation with each other in the longitudinal center plane of the trailer, said shot pins being adapted to be moved outwardly from said jackbox in a locking stroke to engage said gooseneck bushings and inwardly in a return stroke to disengage said gooseneck bushings;
   (h) abutment means defining the limits of the locking stroke and the return stroke of said shot pins;
   (i) a pair of rocker arms fulcrumed on brackets fixed within said jackbox and each having one end pivotally connected to a respective one of said shot pins; and
   (j) a double acting fluid actuator pivotally connected between the opposite ends of said rocker arms and adapted to drive them positively through both the locking stroke and the return stroke, said rocker arms, said brackets, and said double acting actuator being offset laterally in the same direction from said longitudinal center plane of the trailer.

3. The combination set forth in claim 2, wherein one of said abutment means is defined by the inner end of each said jackbox bushing and a transverse shoulder on each said shot pin.

4. The combination set forth in claim 2, wherein one of said abutment means is defined by each said rocker arm and a stop abutment on each said fixed bracket.

5. The combination set forth in claim 2, wherein the stop abutments on the inner end of each jackbox bushing and on the transverse shoulder of each said shot pin define the outer limit of the locking stroke, and the stop abutments on each of the fixed brackets and the rocker arms define the inner limit of the return stroke of said shot pins.

6. In a lift bed highway trailer attachable to a tractor by means of a fifth wheel connection and adapted to carry a pallet frame unit with legs spaced to straddle the trailer, the combination comprising:
   (a) a liftable main frame having a lowered loading and unloading position and a raised transport position;
   (b) a subframe underlying said main frame and pivotally connected to same;
   (c) a wheeled suspension underlying said subframe and adapted to serve as a ground support therefor;
   (d) a gooseneck fixed to the forward end of said main frame and having a pair of longitudinal structural members and a pair of transverse structural members defining a jackbox opening therebetween;
   (e) a jackbox mounted within said opening for vertical sliding movement relative to said gooseneck, said jackbox being adapted for attachment to the tractor fifth wheel;
   (f) power lift means for moving said main frame and gooseneck between the lowered loading and unloading position and the raised transport position;

(g) a pair of power actuated shot pins mounted in said jackbox in axially spaced relation with each other and adapted to be moved outwardly therefrom in a locking stroke to engage said gooseneck and inwardly in a return stroke to disengage said gooseneck;

(h) abutment means defining the limits of the locking stroke and the return stroke to said shot pins;

(i) means including a double acting fluid actuator connected between said shot pins and adapted to drive them positively through both the locking stroke and the return stroke; and (j) a resilient biasing means disposed within said fluid actuator and adapted to maintain said pins in locked position in event of failure of power to said actuator.

7. In a lift bed highway trailer attachable to a tractor by means of a fifth wheel connection and adapted to carry a pallet frame unit with legs spaced to straddle the trailer, the combination comprising:

(a) a liftable main frame having a lowered loading and unloading position and a raised transport position;

(b) a gooseneck fixed to the forward end of said main frame having a pair of longitudinal structural members and a pair of transverse structural members defining a jackbox opening therebetween;

(c) a first pair of bushings mounted in the jackbox opening and secured to respective ones of said gooseneck structural members;

(d) a jackbox mounted within said opening for vertical sliding movement relative to said gooseneck, said jackbox being adapted for attachment to the tractor fifth wheel;

(e) power lift means for moving said main frame and gooseneck between the lowered position and the raised transport position;

(f) a second pair of bushings mounted in said jackbox and situated for registration with said first pair of bushings when said liftable main frame is in the raised transport position;

(g) a pair of power actuated shot pins slidably mounted in said jackbox bushings in axially spaced relation with each other and adapted to be moved outwardly therefrom in a locking stroke to engage said gooseneck bushings and inwardly in a return stroke to disengage said gooseneck bushings;

(h) abutment means defining the limits of the locking stroke and the return stroke of said shot pins;

(i) a pair of rocker arms fulcrumed on brackets fixed witin said jackbox and each having one end pivotally connected to a respective one of said shot pins;

(j) a double acting fluid actuator pivotally connected between the opposite ends of said rocker arms and adapted to drive them positively through both the locking stroke and the return stroke, said actuator having an extended position in which said arms are retracted and a retracted position in which said arms are extended; and (k) a retractor spring disposed within said actuator and adapted to maintain same in retracted position in event of failure of power to said actuator.

8. The combination set forth in claim 6, wherein said resilient biasing means is a retractor spring.

9. The combination set forth in claim 7, wherein said retractor spring is disposed between the rod end of the actuator cylinder and the opposed face of the piston.

* * * * *